(12) United States Patent
Adachi et al.

(10) Patent No.: US 6,988,880 B2
(45) Date of Patent: Jan. 24, 2006

(54) APPARATUS FOR CUTTING AND SHAPING RUBBER BAND MEMBERS

(75) Inventors: Masami Adachi, Kodaira (JP); Takao Urayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/929,481

(22) Filed: Aug. 31, 2004

(65) Prior Publication Data

US 2005/0025852 A1 Feb. 3, 2005

Related U.S. Application Data

(62) Division of application No. 10/058,374, filed on Jan. 30, 2002, now Pat. No. 6,824,720.

(30) Foreign Application Priority Data

Feb. 2, 2001 (JP) .............................. 2001-26471

(51) Int. Cl.
*B29C 69/00* (2006.01)
*B29C 43/40* (2006.01)
*B29C 51/32* (2006.01)

(52) U.S. Cl. ...................... 425/299; 264/148; 264/149; 264/163; 156/110.1; 156/118; 156/123; 156/124; 156/130.7; 83/16; 83/171; 83/658; 425/298; 425/308; 425/310; 425/311

(58) Field of Classification Search ................ 264/157, 264/163, 148, 149; 156/110.1, 118, 123, 156/124, 130.7; 83/16, 171, 658; 425/308, 425/310, 311, 298, 299
See application file for complete search history.

(56) References Cited

U.S. PATENT DOCUMENTS

| 1,975,219 A | 10/1934 | Alexander ................... 83/676 |
| 4,779,658 A | 10/1988 | Kawabata et al. .......... 152/517 |
| 4,878,521 A | 11/1989 | Fredrickson ................ 141/1.1 |

(Continued)

FOREIGN PATENT DOCUMENTS

DE 3808005 A1 * 9/1988

(Continued)

OTHER PUBLICATIONS

Transcript of Oral Translation of Paragraph #30 of EP-1072395-A1, Jul. 2004.*

(Continued)

*Primary Examiner*—Michael P. Colaianni
*Assistant Examiner*—Michael I. Poe
(74) *Attorney, Agent, or Firm*—Oliff & Berridge, PLC

(57) ABSTRACT

Apparatus for highly reliably cutting a rubber strip (12) even when reinforcement cords are embedded therein, and for shaping the upper surfaces of the trailing end of a resultant rubber band member (15) and the leading end of the remaining rubber strip (12) to have a slope inclined with a small angle relative to the general plane of the rubber strip (12) or rubber band member (15). An anvil (20) and a press cutter/shaper (39) are arranged opposite to each other, and a cutting blade (38) is gradually inserted into an anvil groove (22), with at least one surface (38a, 38) of the blade (38) pressed against a periphery (22a) of the anvil groove (22). The cutting blade (38) protrudes from the boundary between inclined a pair of shaping surfaces (34, 35) towards the anvil 20, and has a cutting blade angle (F) that is smaller than angle (G) between the inclined shaping surfaces (34, 35).

5 Claims, 2 Drawing Sheets

U.S. PATENT DOCUMENTS

| | | | | |
|---|---|---|---|---|
| 4,940,557 | A | * | 7/1990 | Kimura .................... 264/472 |
| 5,015,223 | A | | 5/1991 | Boeckmann .............. 493/194 |
| 5,293,795 | A | | 3/1994 | Osawa et al. ................ 83/16 |
| 5,375,751 | A | | 12/1994 | Makinen .................... 225/1 |
| 5,552,101 | A | | 9/1996 | Fujii et al. ................ 264/163 |
| 5,613,414 | A | | 3/1997 | Murphy et al. .............. 83/16 |
| 5,901,619 | A | | 5/1999 | Aihara ...................... 76/115 |
| 6,824,720 | B2 | | 11/2004 | Adachi et al. ............ 264/157 |

FOREIGN PATENT DOCUMENTS

EP            1072395 A1     1/2001

OTHER PUBLICATIONS

Derwent Abstract of DE 3808005 A1, 1988, Derwent Information Limited, Derwent Week # 198839.*

* cited by examiner

APPARATUS FOR CUTTING AND SHAPING RUBBER BAND MEMBERS

CROSS-REFERENCE TO RELATED APPLICATION

This is a divisional application of U.S. application Ser. No. 10/058,374 filed on Jan. 30, 2002, now U.S. Pat. No. 6,824,720.

BACKGROUND OF THE INVENTION

1. Field of Invention

The present invention relates to method and apparatus for cutting a rubber strip at a predetermined longitudinal position and for shaping the upper surfaces of the trailing end of the rubber band member and the leading end of the remaining rubber strip to have a slope with a small angle relative to the general plane of the rubber strip or rubber band member.

2. Description of Related Art

Generally, tire production involves a process wherein an unvulcanized rubber strip, e.g., a long stretch of inner liner, is cut into rubber band members each having a predetermined length. Subsequently, the rubber member is wound around a shaping drum, with its leading end laid over the trailing end and adhered thereto. When such a rubber strip is cut into band members, both the leading end and the trailing end of the rubber member are shaped to have a slope in the thickness direction with a small angle relative to the general plane, in order to ensure that the rubber member has a thickness at the joint region, which is the same as the thickness at the remaining region of the rubber member, to thereby improve the product quality in terms of uniformity of tires.

As disclosed in U.S. Pat. No. 5,293,795, for example, it has been a conventional practice to use an anvil having a flat shaping surface to place the rubber strip thereon, in combination with a press cutter/shaper having a pair of inclined shaping surfaces on the front and rear sides. The inclined shaping surfaces of the cutter/shaper have a small inclination angle relative to the shaping surface of the anvil, and intersect each other forming a boundary therebetween. In this instance, after the rubber strip has been placed on the shaping surface of the anvil, the press cutter/shaper under a heated condition is advanced toward the anvil and brought into pressure contact with the rubber strip so as to cut it at a predetermined location within the region of the boundary between the front and rear shaping surfaces. Also, while the press cutter/shaper in pressure contact with the rubber strip is advanced toward the anvil, the trailing end of the rubber member and the leading end of the remaining rubber strip are progressively deformed and shaped by the inclined shaping surfaces of the cutter/shaper on the front and rear sides, respectively, to have a cross-section having a gradually reduced thickness and forming a relatively small angle with reference to the flat shaping surface of the anvil.

The conventional procedure as mentioned above proved to be generally effective for efficiently cutting and shaping a thin strip of unvulcanized rubber into rubber band members with a desired shape. However, it has been found that such procedure may not be applicable to particular types of rubber strip, such as a stretch of inner liner in which chafers with textile cords embedded therein are applied to, and along the side edges of the inner liner. This is because the textile cords embedded in the chafers impede cutting of the rubber strip, besides that the inclined shaping surfaces of the cutter/shaper are joined to each other at an obtuse intersection angle that is typically as large as about 170° for the purpose of the desired shaping.

SUMMARY OF THE INVENTION

It is therefore an object of the present invention to provide a method and an apparatus, capable of readily cutting and shaping a rubber strip even when textile cords are embedded therein.

Briefly stated, according to the present invention, a rubber strip is cut and shaped into rubber band members by an apparatus which comprises an anvil having a flat shaping surface with an anvil groove that extends in the width direction of a rubber strip to be placed thereon, a press cutter/shaper arranged opposite to the anvil, a heating means for heating the press cutter/shaper to a predetermined temperature, and a moving means for moving the press cutter/shaper relative to the anvil. The press cutter/shaper comprises a pair of inclined shaping surfaces on front and rear sides, wherein these shaping surfaces of the press cutter/shaper are each inclined with a relatively small angle relative to the shaping surface of the anvil so as to intersect with each other at a predetermined intersection angle. The press cutter/shaper further comprises a cutting blade arranged between the front and rear shaping surfaces of the press cutter/shaper and protruding therefrom toward the anvil groove, wherein the cutting blade has a blade angle defined by front and rear surfaces of the cutting blade, which is smaller than the intersection angle of the shaping surfaces of the press cutter/shaper.

According to the present invention, a rubber strip to be cut and shaped into rubber band members is placed onto the anvil, and the press cutter/shaper heated to a predetermined temperature is then moved toward the anvil so that the cutting blade is forced into anvil groove while cutting the rubber strip at a predetermined cut position in its longitudinal direction to form a rubber band member. On this occasion, the trailing end of the rubber band member and the leading end of the remaining rubber strip are clamped between the front and rear shaping surfaces of the press cutter/shaper and the flat shaping surface of the anvil, respectively, and thereby progressively deformed and shaped to have a cross-section with a thickness which decreases gradually toward the cut position.

In the apparatus according to the present invention, in addition to a pair of inclined shaping surfaces, the press cutter/shaper comprises a cutting blade with a blade angle that is smaller than the intersection angle of the shaping surfaces of the press cutter/shaper. The cutting blade serves to positively cut the rubber strip into rubber members even when reinforcing cords are embedded in the rubber strip, while the inclined shaping surfaces serve to progressively deform and shape the trailing end of the rubber band member and the leading end of the remaining rubber strip, which are clamped between the front and rear shaping surfaces of the press cutter/shaper and the flat shaping surface of the anvil, respectively. Such a unique arrangement of the press cutter/shaper simultaneously allows for the cutting blade to have a blade angle suitable for cutting the rubber strip, and also for the inclined shaping surfaces to have an intersection angle that can be optimized primarily for the deformation and shaping of the trailing end of the rubber band member and the leading end of the remaining rubber strip.

It is preferred that at least one of the front surface and rear surface of the cutting blade is pressed against corresponding edge of the anvil groove so as to cut the rubber strip at a predetermined cut position. In this instance, it is possible to stably cut the rubber strip successively over a long period, since the edge of the cutting blade is effectively prevented from premature wear.

For achieving a more positive cutting of the rubber strip, it is preferred that both the front and rear surfaces of the cutting blade are pressed against respective edges of the anvil groove so as to cut the rubber strip at predetermined two sites.

When the cutting of the rubber strip is carried out at two sites as mentioned above, however, rubber scraps of the rubber strip are generated as a result of cutting, and such scraps tend to accumulate in the anvil groove. Unless removed or otherwise treated properly, the rubber scraps as being successively accumulated in the anvil groove often result in formation of undesirable solid mass that tends to adhere to the rubber strip or rubber band member. In order to effectively avoid possible accumulation of rubber scraps in the anvil groove, it is preferred that the anvil groove is V-shaped in cross-section, having a groove wall intersection angle between front and rear walls of the anvil groove, wherein the groove wall intersection angle is approximately same as the blade angle of the cutting blade.

BRIEF DESCRIPTION OF THE DRAWINGS

The present invention will now be explained in further detail hereinafter, with reference to a preferred embodiment shown in the accompanying drawings.

DETAILED DESCRIPTION OF PREFERRED EMBODIMENTS

Figure 1:
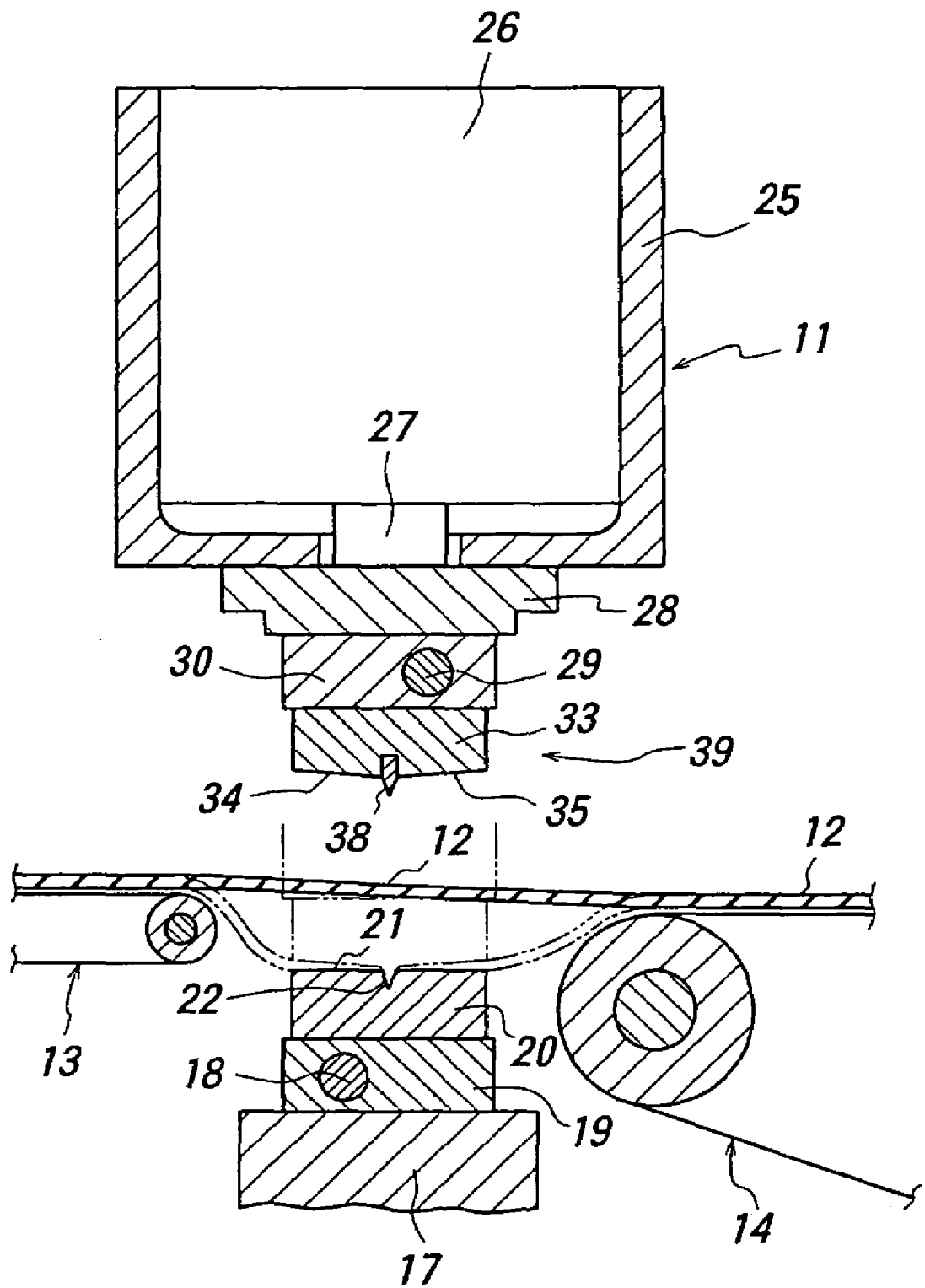
FIG. 1 is a sectional view of the apparatus according to the present invention.
Figure 2:
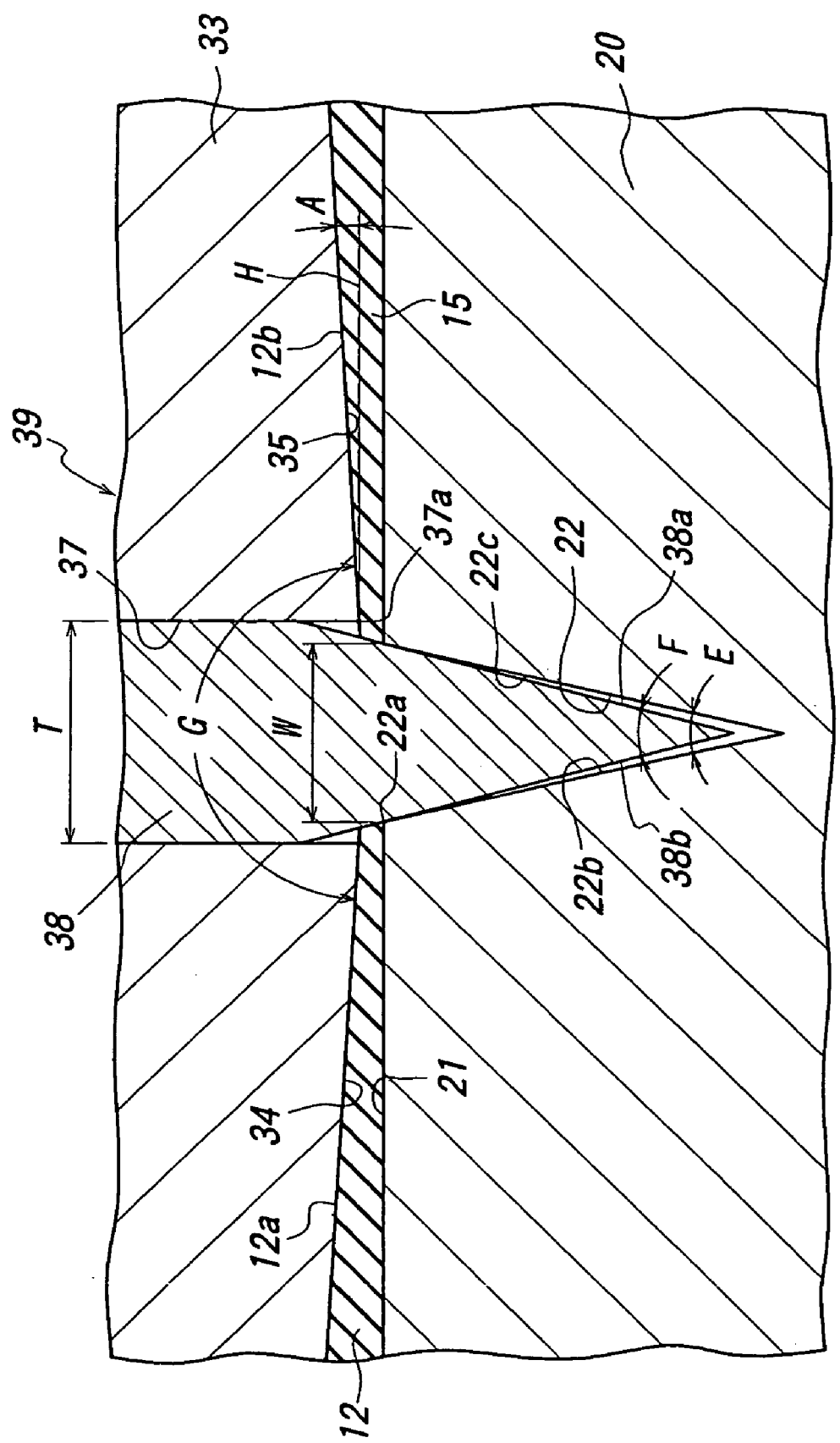
FIG. 2 is an enlarged view showing the cutting blade and associated elements of the apparatus.

Referring now to FIGS. 1 and 2, there is shown a cutting/shaping apparatus according to one embodiment of the present invention, which is designated as a whole by reference numeral 11. The apparatus 11 serves to successively perform cutting and shaping of an unvulcanized rubber strip 12 into rubber band members 15 having a predetermined length. The rubber strip 12 may be a stretch of inner liner having textile cord-reinforced chafers bonded thereto at places where the ends of succeeding strips of the member are to be formed.

In front of the cutting/shaping apparatus 11, i.e., on the left side in FIG. 1, there is provided a supply conveyor 13 which can be driven to supply the rubber strip 12 to the apparatus 11. A delivery conveyor 14 is arranged behind the cutting/shaping apparatus 11, i.e., on the right side in FIG. 1. The delivery conveyor 14 carries the rubber band members 15 obtained by successively cutting the rubber strip 12 by means of the cutting/shaping apparatus 11, and can be driven to deliver the rubber members 15 from the apparatus 11 to a next station.

The cutting/shaping apparatus 11 includes a stationary lower frame 17, which is arranged below the conveying surface of the conveyors 13, 14. The lower frame 17 extends horizontally in the width direction of the rubber strip 12, and has a horizontal upper surface on which a lower heating block 19 is fixedly mounted. The lower heating block 19 is provided with a heater 18 therein, and extends in parallel with the upper surface of the lower frame 17.

An anvil 20 is fixedly mounted on the upper surface of the lower heating block 19 in parallel therewith. The anvil 20 has a flat upper surface 21 that serves to shape the leading end of the rubber strip 12 and the trailing end of the rubber band member 15, in the manner to be described hereinafter. The anvil 20 can be heated to a predetermined temperature by the heater 18 of the lower heating block 19. At the center of the flat shaping surface 21 of the anvil 20 as seen in the longitudinal direction of the rubber strip 12, there is provided an anvil groove 22 that extends in the width direction of the rubber strip 12. It is assumed that the length of the anvil groove 22 is larger than the width of the rubber strip 12.

A stationary upper frame 25 is arranged above the lower frame 17 and just opposite thereto, and extends horizontally in the width direction of the rubber strip 12. A plurality of fluid cylinders 26 are attached to the upper frame 25, and spaced from each other in the width direction of the rubber strip 12 by an equal interval. These fluid cylinders 26 serve as means for moving the upper frame 25 in the vertical direction. Each fluid cylinder 26 has a piston rod 27 of which the free end is fixedly connected to a movable plate 28 that can be moved in parallel with the upper frame 25. The movable plate 28 has a bottom surface that supports an upper heating block 30 in parallel with the plate 28. The upper heating block 30 is provided with a heater 29 therein, and extends in parallel with the bottom surface of the movable plate 28.

A press body 33 is fixedly secured to the bottom surface of upper heating block 30 and extends in parallel therewith. The press body 33 has a pair of inclined shaping surfaces 34, 35. The shaping surfaces 34, 35 are arranged relative to each other such that the boundary therebetween, or the midpoint as seen in the longitudinal direction of the rubber strip 12, is located just above the anvil groove 22. Each of the inclined shaping surfaces 34, 35 has a slope in profile, or a surface that is raised progressively upward, as seen from the boundary of the shaping surfaces 34, 35 either forward or backward in the longitudinal direction of the rubber strip 12.

The inclined shaping surfaces 34, 35 of the press body 33 has an inclination angle A relative to the horizontal plane H, which is made as small as 3 to 5 degrees. Thus, when the piston rod 27 of the fluid cylinder 26 is extended to lower the press body 33, the rubber strip 12 is clamped between the inclined shaping surfaces 34, 35 of the press body 33 and the flat shaping surface 21 of the anvil 20, and thereby deformed and shaped to have a desired cross-section which becomes progressively thinner toward the boundary. As a result, the rubber strip 12 has upper surface portions 12a, 12b with a small inclination angle relative to the horizontal plane H, wherein these surface portions 12a, 12b are shaped by the inclined shaping surfaces 34, 35 of the press body 33, respectively.

On the boundary between the inclined shaping surfaces 34, 35 (i.e., just above the anvil groove 22), the press body 33 has a fixing groove 37 that extends in parallel with the anvil groove 22 and has the same length as the latter. The fixing groove 37 serves to fixedly secure a thin plate-like cutting blade 38, which thus extends in parallel with the anvil groove 22. The cutting blade 38 has an upper end inserted into the fixing groove 37 and fixedly secured thereto, such that the lower end of the cutting blade 38 protrudes from the boundary between the inclined shaping surfaces 34, 35 downward, i.e., toward the anvil 20.

The press body 33 and the cutting blade 38 as a whole constitute a press cutter/shaper 39 for cutting and shaping the rubber strip 12 into rubber band members 15 in a desired manner. The press cutter/shaper 39 is heated by the heater 29 to a predetermined temperature, which is slightly higher than that of the anvil 20. Further, by activating the fluid liquid cylinders 26, the press cutter/shaper 39 can be lowered toward the anvil 20, or raised away from the anvil 20.

The lower end of the cutting blade 38 is tapered, i.e., V-shaped in cross-section, so as to form a cutting edge. As a consequence, the front and rear surfaces 38a, 38b of the cutting blade 38 each forms a slope inclined by the same angle with respect to a vertical plane. In addition to the thin plate-like shape of the cutting blade 38, the angle F formed between the front and rear surfaces 38a and 38b of the cutting blade 38 is much smaller than the angle G (170–174 degrees) between the inclined shaping surfaces 34 and 35.

When the press cutter/shaper 39 is driven by the piston rods 27 of the fluid cylinders 26 and thereby lowered toward the anvil 20, the lower end of the cutting blade 38 is inserted into the anvil groove 22 until both the front and rear surfaces of the cutting blade 38 are pressed against the opening edges 22a of the anvil groove 22 with the rubber strip 12 therebetween. This is because the width W at the opening of the anvil groove 22 is slightly smaller than the maximum thickness T of the cutting blade 38. Thus, the rubber strip 12 is cut at two sites along the longitudinal direction, which are spaced from each other by a distance that is equal to the above-mentioned width W of the anvil groove 22.

Since the cutting of the rubber strip 12 is achieved by pressing the front and rear surfaces 38a, 38b of the cutting blade 38 against the periphery 22a of the anvil groove as described above, the tip end of the cutting blade 38 is effectively prevented form premature wear. Hence, the cutting blade 38 can be used for successive cutting of the rubber strip 12, over a long period of time. Moreover, the cutting of the rubber strip 12 can be achieved highly reliably, when it is done at two sites as mentioned above, as compared to the cutting at a single site only.

When the front and rear surfaces 38a, 38b of the cutting blade 38 are pressed against the periphery at the opening of the anvil groove 22 in the manner described above, narrow gaps are formed between the flat shaping surface 21 of the anvil 20 and the boundary of the inclined shaping surfaces 34, 35 of the press body 33, particularly between the flat shaping surface 21 and the periphery 37a of the fixing groove 37. Thus, it is preferred that when the press cutter/shaper 39 is lowered toward the anvil 20, the front and rear surfaces 38a, 38b of blade are pressed against the periphery 22a of the anvil groove 22, before the periphery 37a of the fixing groove 37 come into contact with the flat shaping surface 21, in order to achieve a reliable cutting of the rubber strip 12.

Further, the anvil groove 22 for receiving the cutting blade 38 is made to have a V-shaped cross-section, of which the angle E (groove angle) between the front and rear walls is made approximately equal to, or slightly smaller than the angle F (blade angle) between the front and rear surfaces 38a, 38b of the cutting blade 38. As a consequence, when the front and rear surfaces 38a, 38b of the cutting blade 38 are pressed against the periphery 22a of the anvil groove 22, narrow gaps are formed between the front wall 38a of the anvil groove 22 and the front surface 22b of the cutting blade 38, and between the rear wall 38b of the anvil groove 22 and the rear surface 22c of the cutting blade 22, the gaps becoming wider towards the blade tip end.

The anvil groove 22 may have a rectangular cross-section. In this instance, assuming that the rubber strip 12 is cut at two sites as described above, rubber scraps are generated as a result of cutting and accumulate in the anvil groove 22 thereby gradually forming a solid mass that tends to adhere to the rubber strip 12 or rubber band member 15. In order to effectively avoid such accumulation of the rubber scraps in the anvil groove 22, it is preferred that the anvil groove 22 has a V-shaped cross-section and a groove angle E that is made approximately equal to the blade angle F of the cutting blade 38.

The operation of the apparatus for cutting and shaping a rubber strip into rubber band members according to the above-described embodiment will be explained below.

First of all, the supply conveyor 13 is displaced just in front of the delivery conveyor 14, with a rubber strip 12 placed thereon. Then, the two conveyors 13, 14 are operated synchronously with each other, thereby causing the rubber strip 12 to be transferred from the supply conveyor 13 to the delivery conveyor. The transfer of the rubber strip 12 is stopped when a predetermined cut position of the rubber strip 12 reaches just above the anvil groove 22. The supply conveyor 13 is then slightly displaced forward while being temporarily operated, thereby forming a festoon of the rubber strip 12 within a space between the press cutter/shaper 39 and the anvil 20 so that the festoon of the rubber strip 12 is placed onto the flat shaping surface 21 of the anvil 20. On this occasion, it is assumed that the predetermined position of the rubber strip 12 coincides with the anvil groove 22 as described above. It is further assumed that the anvil 20 and the press body 39 are heated by the heater 18, 29, respectively, so that the press body 39 is at a predetermined temperature slightly higher than that of the anvil 20.

Then, the fluid cylinders 26 are activated to extend the piston rods 27 so that the press body 39 is lowered toward the anvil 20. During such a downward movement of the press body 39, the rubber strip 12 at its festoon between the conveyors 13, 14 is pressed downward by the press cutter/shaper 39. Before the press cutter/shaper 39 is completely lowered to its lower limit position, the tip end of cutting blade 38 is gradually inserted into the anvil groove 22. During such a process, however, the rubber strip 12 is only so deformed as to take a V-shaped cross-section, but the cutting does not take place as yet.

Subsequently, when the press cutter/shaper 39 has been completely lowered to its lower limit position, the front and rear surfaces 38a, 38b of the cutting blade 38 are pressed against the periphery 22a of the anvil groove 22, and the rubber strip 12 is thereby cut at two sites spaced longitudinally from each other by a distance that is equal to the width W of the anvil groove 22. On this occasion, since, as mentioned above, the cutter blade 38 protrudes toward the anvil 20 from the boundary between the inclined shaping surfaces 34, 35, and the blade intersection angle F between the front and rear surfaces 38a, 38b is smaller than the slope intersection angle G between the inclined shaping surfaces 34, 35 on the front and rear sides, the rubber strip 12 can be easily and reliably cut into a rubber band member 15, even when the rubber strip 12 has reinforcement cords embedded therein.

Moreover, since because the press cutter/shaper 39, in particular the press body 33, has a pair of inclined shaping surfaces 34, 35 each being inclined with a small angle relative to the flat shaping surface 21 of the anvil 20, those regions of the rubber segment 12 which are situated immediately on the front and rear sides of the cut position are clamped or pressed between the inclined shaping surfaces 34, 35 and the flat shaping surface 21 of the anvil 20 and thereby deformed to have a cross-section that becomes gradually thinner toward the cut position, so that the upper surface portions 12a, 12b of the rubber strip 12 are inclined by a small angle with relative to the flat shaping surface 21 of the anvil 20.

According to the present invention, as explained above, the cutting and shaping of the rubber strip are performed by separate mechanisms. Thus, the cutting is performed by the engagement of the cutting blade 38 with the anvil groove 22, whereas the shaping of the rubber strip 12 or the rubber belt member 15 is performed by clamping and pressing the rubber material between the inclined shaping surfaces 34, 35 and the flat shaping surface 21. It is therefore possible to adopt an optimum inclination angle of the shaping surfaces 34, 35 relative to the flat shaping surface 21 of the anvil 20, which can be made as small as about three degrees. As a result, a constant thickness of the rubber band member 15 can be readily realized even when it is wound around a shaping drum, with the leading and trailing ends of the rubber band member 51 laid over and bonded to each other, so that the thickness at the joint is substantially the same as that at the remaining region of the rubber band member 15.

Subsequently, the piston rods 27 of the fluid cylinders 26 are retracted so that the press cutter/shaper 39 is raised and returned to its original position. The delivery conveyor 14 is then operated to transfer the rubber band member 15 to a next station for a succeeding processing, which may be the shaping drum. At the same time, the supply conveyor 13 is operated so as to remove the leading end of the remaining rubber strip 12 from the anvil 20 and move it back onto its conveyor surface.

It will be appreciated from the foregoing detailed description that, according to the present invention, it is readily possible to effectively and efficiently cut a rubber strip 12 into rubber band members 15, even when reinforcement cords are embedded in the rubber strip 12.

While the present invention has been described above with reference to a preferred embodiment shown in the drawings, it is needless to say that various changes and/or modifications may be made without departing from the scope of the invention as defined by the appended claims.

Thus, for example, while the cutting of the rubber strip 12 is performed in the illustrated embodiment by pressing the front and rear surfaces 38a, 38b of the cutting blade 38 against the periphery 22a of the anvil groove 22 having a v-V-shaped cross-section, the anvil groove may have a square cross-section and the cutting of the rubber strip may be performed by pressing the tip end of the cutting blade against the bottom of the anvil groove.

Furthermore, while the cutting of the rubber strip 12 in the illustrated embodiment is performed at two sites, by pressing the front and rear surfaces 38a, 38b of the cutting blade 38 against both sides of the periphery 22a of the anvil groove 22, the cutting of the rubber strip 12 may be performed at a single site only, by pressing either one of the front and rear surfaces 38a, 38b against the corresponding side of the periphery 22a of the anvil groove 22. In this instance, it is possible to eliminate formation of rubber scraps or formation of solid mass that tends to adhere to the rubber band member or remaining rubber strip.

Also, while the cutting blade 38 has been described as being fixedly secured to the press body 33, the cutting blade may form an integral part of the press body, or may be movable relative to the press body and projected by an associated actuator only during the cutting, after the upper surface regions of the rubber strip have been deformed and shaped to a predetermined extent.

Still further, while the groove intersection angle E of the anvil groove 22 has been explained as being slightly smaller than the blade intersection angle F, the two intersection angles may be the same as each other. Also, instead of driving the cutter/shaper 39 to be moved toward and away from the anvil 20, it is possible to drive the anvil and move it toward and away from the press cutter/shaper.

What is claimed is:

1. An apparatus for cutting/shaping a rubber strip into rubber band members, comprising:
    an anvil having a flat shaping surface with an anvil groove that extends in the width direction of a rubber strip to be placed thereon;
    a press cutter/shaper arranged opposite to the anvil, said press cutter/shaper comprising a pair of inclined shaping surfaces on front and rear sides, each being inclined with a relatively small angle relative to the shaping surface of the anvil so that the front and rear shaping surfaces of the press cutter/shaper intersect each other with a predetermined intersection angle, and a cutting blade arranged between the front and rear shaping surfaces of the press cutter/shaper and protruding therefrom toward the anvil groove, said cutting blade having a blade angle defined by front and rear surfaces of the cutting blade, said blade angle being smaller than said intersection angle of the shaping surfaces of the press cutter/shaper;
    a heating means for heating the press cutter/shaper to a predetermined temperature; and
    means for moving the press cutter/shaper toward the anvil close to each other to press at least one of the front surface and the rear surface of the cutting blade against a corresponding edge of the anvil groove to thereby cut the rubber strip between the at least one of the front surface and the rear surface and the corresponding edge at a predetermined cut position;
    wherein the press cutter/shaper heated by said heating means is adapted to be moved by said moving means toward the anvil so that the cutting blade is forced into the anvil groove while cutting the rubber strip at a predetermined cut position in its longitudinal direction to form a rubber band member, with a trailing end of the rubber band member and a leading end of the remaining rubber strip being clamped between the front and rear shaping surfaces of the press cutter/shaper and the flat shaping surface of the anvil, respectively, and thereby deformed and shaped to have a cross-section with a thickness which decreases gradually toward said cut position.

2. An apparatus according to claim 1, wherein said cutting blade is arranged so that both the front and rear surfaces of the cutting blade can be pressed against respective edges of the anvil groove so as to cut the rubber strip at two predetermined cut positions.

3. An apparatus according to claim 1, wherein said cutting blade has a maximum thickness that is slightly larger than a width of said anvil groove.

4. An apparatus according to claim 1, wherein said rubber strip has reinforcement cords embedded therein.

5. An apparatus according to claim 4, wherein said rubber strip is a stretch of inner liner in which chafers with reinforcement cords embedded therein are applied to side edges of the inner liner.

* * * * *